United States Patent [19]

Burford et al.

[11] 4,185,635
[45] Jan. 29, 1980

[54] ANIMAL EAR TAG APPLICATOR

[75] Inventors: John R. Burford; Paul Slater, both of Palmerstron North, New Zealand

[73] Assignee: Delta Plastics Limited, Palmerston North, New Zealand

[21] Appl. No.: 791,607

[22] Filed: Apr. 27, 1977

[30] Foreign Application Priority Data

Apr. 29, 1976 [NZ] New Zealand .................. 180734

[51] Int. Cl.² .................... A01K 11/00; A61B 17/00
[52] U.S. Cl. ................................ 128/330; 227/144
[58] Field of Search ............ 128/330, 329 R; 40/301, 40/302, 300; 81/313, 352, 373, 323; 227/144

[56] References Cited

U.S. PATENT DOCUMENTS

| | | | |
|---|---|---|---|
| 2,555,133 | 5/1951 | Horstmann | 128/329 |
| 3,812,859 | 5/1974 | Murphy et al. | 128/330 |
| 4,068,668 | 1/1978 | Moore et al. | 128/330 |

*Primary Examiner*—Robert W. Michell
*Assistant Examiner*—Michael H. Thaler

[57] ABSTRACT

An applicator, for animal ear tags, of the type having two lever members pivoted together. The levers are formed on one side of the pivot point as handles. A body is mounted to one lever at the other side of the pivot and has a pin which normally projects therefrom. Apparatus is provided to retain a female component of an ear tag opposite the pin and this forms part of the aforementioned one lever. Within the body there is an apparatus to retract the pin from within the stem of a male component of an ear tag immediately upon the male and female components being coupled together following movement of the pin towards the retention apparatus.

20 Claims, 6 Drawing Figures

ANIMAL EAR TAG APPLICATOR

This invention relates to an applicator for animal ear tags.

In our U.S. Pat. No. 3,731,414 there is described an ear tag which is fully flexible and incorporates a metal tip at the outer end of the hollow stem of the male component. This metal tip provides an annular abutment inside the stem and in application a shoulder on the pin of an applicator engages with the annualar abutment so that a driving force is provided between the applicator pin and the enlarged head of the stem. An applicator for use with these tags is disclosed in our U.S. Pat. No. 3,812,859.

Whilst the applicator has been quite successful problems can arise with bent and broken pins. One reason for the pin becoming bent or broken arises from the action of the pin being in an arc and thus if the tag components are incorrectly placed on the applicator a tangential or sideways force can arise which damages the pin. A further reason for damage is movement of the animals head before the pin is withdrawn from the male component. This arises especially when the animals head is not secured or otherwise firmly retained.

The aim of the present invention is to overcome these problems by providing an applicator where the locating/driving pin has a straight line action and is retracted from the tag immediately the male component of the tag being applied is located in the female component.

Broadly the invention consists of an applicator for animal ear tags comprising two lever members pivoted together, the levers on one side of their pivot being formed as handles, a body mounted on one lever on the other side of the said pivot and having a pin normally projecting therefrom, means for retaining a female component of an ear tag opposite the pin said means being formed as part of the said one lever and means within the said body which retract the pin from within the stem of a male component of an ear tag immediately said male and female components are coupled together, following movement of the pin toward the retention means.

In the following description of a preferred form of the invention reference will be made to the accompanying drawings in which.

Figure 1:
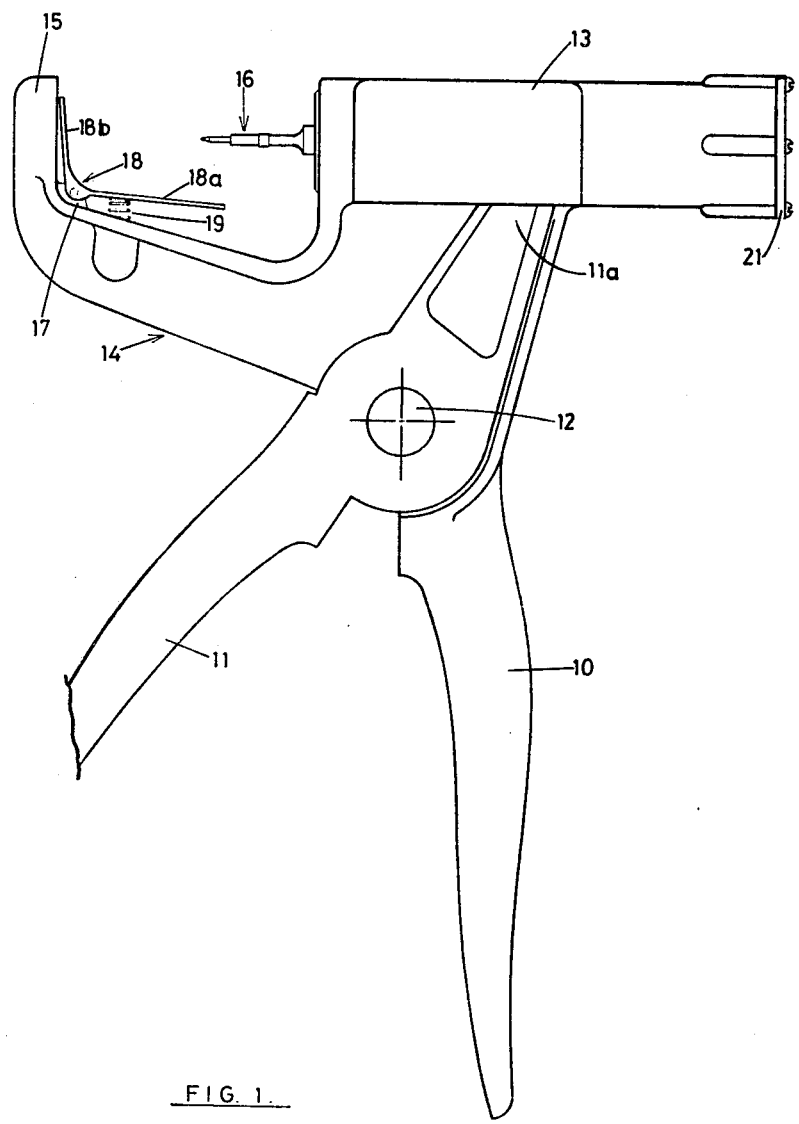
FIG. 1 is a side view of the applicator.

Referring firstly to FIG. 1, the lever members 10 and 11 are joined by a pivot 12 and body 13 is either cast as part of member 10 or mechanically fastened thereto. Member 10 is formed to provide a generally U shaped arm 14 at its upper end which extends away from the body 13. The remote leg 15 of arm 14 has a stepped open slot (not shown) formed therein and this slot has a radiused base which is concentric with a hole (not shown) in the leg 15, and into which the pin 16 locates during application. The depth of the stepped slot is such as to take a back boss of the female component of a tag. Raised lugs 17 are located in line with and at the outer sides of the open slot. To retain a female component in place an L shaped arm 18 is provided and this is pivoted at its apex to lugs 17.

A small compression spring 19 engages leg 18a to push leg 18b toward the open slot. An open ended slot (not shown) is provided in leg 18b to locate around the forward boss of a female component. These features and their operation are substantially the same as their counterparts in the applicator of U.S. Pat. No. 3,812,859.

Figure 2:
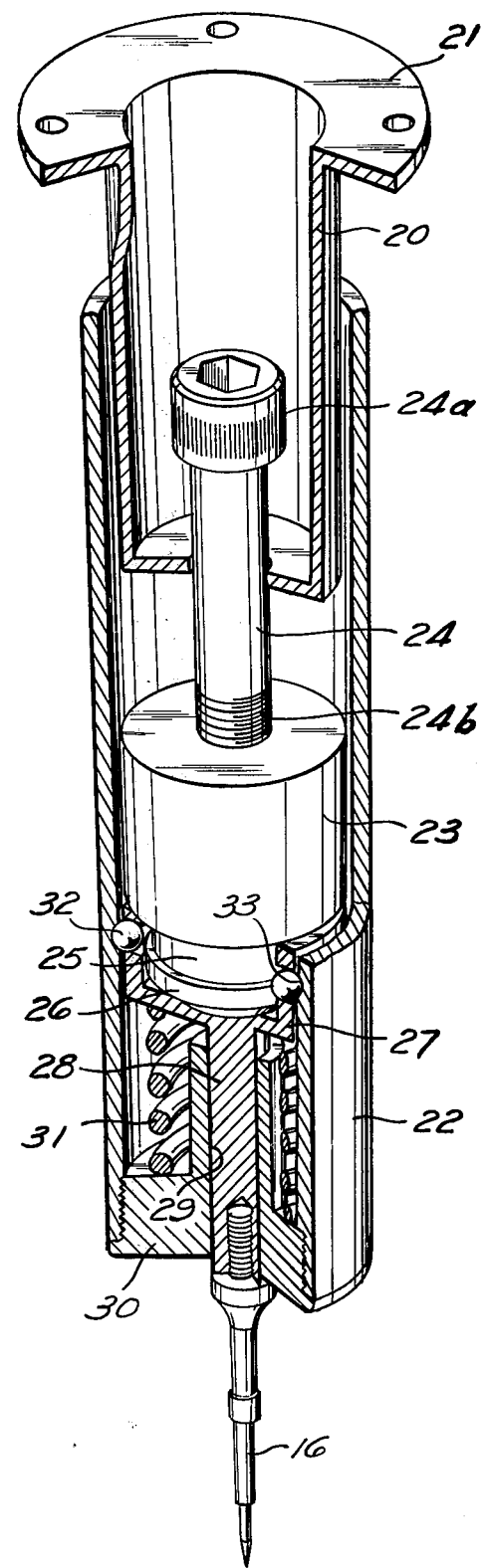
FIG. 2 is a part sectional perspective view of the pin retracting mechanism.

The retracting mechanism is shown in FIG. 2 and consists of a cup 20 which is fastened by rim 21 to the outer end of body 13 (see FIG. 1). The cup locates in one end of a cylinder 22 which slidingly engages within body 13. A cylindrical plug 23 is located in cylinder 22 and is coupled to cup 20 by a limit pin 24. As shown the limit pin 24 has an allen key type head 24a and is screw threaded at the opposite end. This screw threaded end 24b is engaged in a threaded axial opening in plug 23.

An area of reduced diameter 25 is formed at the lower end of plug 23 and includes a peripheral step 26. This reduced area 25 locates in a ball bearing cage 27 which is combined with a pin carrier 28. The carrier 28 projects through a central sleeve 29 in the partially closed end 30 of cylinder 22. A spring 31 is located between closed end 30 and cage 27. A slot (not shown) is formed in the wall of body 13 and through this the upper end 11a of lever 11 projects to couple with cylinder 22. Accordingly cylinder 22 is moved outwardly or inwardly in respect to the body 13 by drawing together or parting levers 10 and 11 respectively.

To explain the operation of the applicator reference is made to FIGS. 3a to 3d.

Figure 3D:
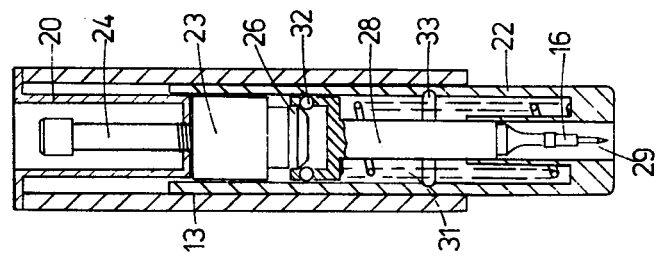
FIGS. 3a to 3d are a series of cross-sectional views of the pin retracting mechanism in various stages of operation.
Figure 3C:
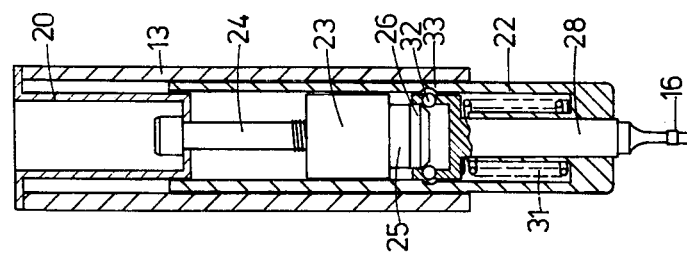
Figure 3B:
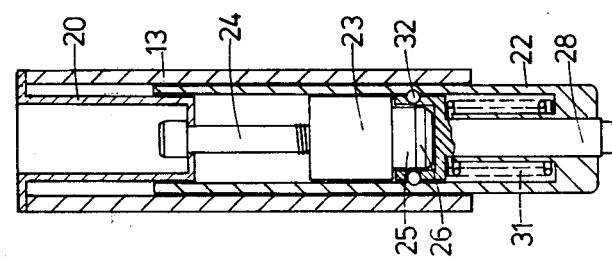
Figure 3A:
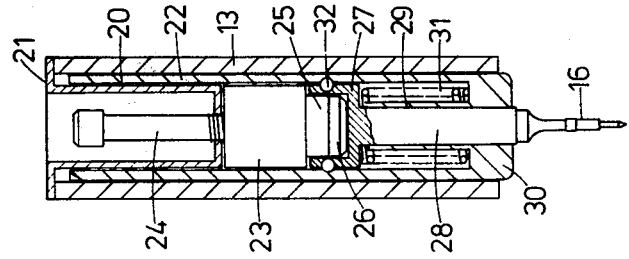

When the handles 10 and 11 are pulled firmly apart spring 31 is compressed and ball bearings 32 register in annular groove 33. An audible 'click' occurs as plug 23 enters the bearing cage 27 and locks the balls 32 into annular groove 33. The pin 16 is now accessible as shown in FIGS. 1 and 3a and ball bearings 32 are held into the annular groove 33 in the cylinder wall by plug 23. The small step 26 on the plug 23 prevents it from slipping out of the ball bearing cage 27. The mechanism is now 'cocked' and the applicator is ready for use, whereupon a female component is located on leg 15 and the stem of a male component on pin 16.

On closing the handles 10 and 11 the cylinder 22 and all internals move as one piece until the male tag has been pierced through the animals ear and is at the point of entering the female tag. At this stage the plug limit pin 24 comes up against the bottom of the stationary cup 20 and the forward travel of the plug 23 is curtailed. This is shown in FIG. 3b. FIG. 3c shows the cylinder 22 after having travelled a further 5 mm. The bearing cage 27 has been pulled forward over the front of the plug 23 and in so doing has almost released the ball bearings 32 from the annular groove 33. At this point the male tag has entered the female tag and is fully located.

After another ½ mm forward travel (see FIG. 3d) the cylinder 22 and bearing cage 27 have moved far enough to completely release the ball bearings 32. The spring 31 immediately fires the plug 23 and bearing cage 27 into the rear position where the plug 23 comes into engagement with cup 20. The pin 16 is thus automatically and rapidly disengaged from the male tag so any movement that results on the animals part merely serves to disengage the applicator from its ear.

The actual extent of outward travel of the plug 23 in respect to the body 13 can be adjusted by screwing limit pin 24 into or from the plug. This adjustment is readily achieved by inserting an allen key into head 24a.

As will be appreciated the pin moves in a straight line as opposed to the arced movement of the pin in the applicator of U.S. Pat. No. 3,812,859. Accordingly, little or no tangential or sideways forces can arise to damage the pin.

What is claimed is:

1. An applicator for animal ear tags comprising a body which includes a handle, lever means pivotally coupled to said body, ear tag component retention means mounted by said body at a position spaced away from said pivot, a first member coupled to said lever means and carried by said body to be movable rectilinearly toward said retention means by movement of said lever means relative to said handle, a second member mounted to be rectilinearly slidingly movable relative to said first member, a pin attached to said second member, means for moving said second member relative to said first member, locking means coupling said second member to said first member such that the pin projects from said first member toward the retention means, and actuating means operable to release said locking means when said first member has moved a determined distance toward the retention means and so permit said moving means to move said second member relative to said first member in a rectilinear direction away from said retention means.

2. An applicator as claimed in claim 1, wherein: the body includes a support means; said first member is slidably located by said support means; and said second member is slidably located by said first member.

3. An applicator as claimed in claim 2, wherein the pin is removably mounted on the second member.

4. An applicator as claimed in claim 1 wherein the said retention means comprises an open slot to the body and in which the boss of the female component of an animal ear tag can locate and a spring biased lever pivotally attached to said body which maintains the boss in said slot during use of the applicator but does not restrict movement of the pin into the said boss.

5. An application for animal ear tags comprising: a body which includes a handle, lever means pivotally mounted to said body, ear tag component retention means mounted by said body at a position spaced away from said pivot; a first member coupled to said lever means and carried by said body to be movable rectilinearly toward said retention means by movement of said lever means relative to said handle; a second member mounted to be movable relative to said first member; a pin attached to said second member; means for moving said second member relative to said first member; locking means coupling said second member to said first member such that the pin projects from said first member toward the retention means; said locking means being formed by a ball-bearing cage attached to said second member, balls of which, in the locked position, engage a seating in the said first member, there being a third member movably located by said first member which engages with said bearing cage to positively locate said balls in the seating, and actuating means operable to release said locking means when said first member has moved a determined distance toward the retention means and so permit said moving means to move said second member relative to said first member in a rectilinear direction away from said retention means.

6. An applicator as claimed in claim 5, wherein said ball bearing cage is cup-shaped with the balls located in openings in the wall thereof, the third member having a projection which engages within said cage to push the balls outwardly through the openings and engage in said seating.

7. An applicator as claimed in claim 5 wherein: the body includes a support means; said first member is slidably located by said support means; said second member is slidably located by said first member; and said actuating means comprises an elongate projection extending from said third member in a fixture mounted by the support means, said elongate projection having engaging means remote from said third member which is engageable with said fixture to restrict movement of said third member relative to the support means.

8. An applicator as claimed in claim 7, further including adjustment means for adjustment of the position of said engaging means relative to said third member.

9. An applicator as claimed in claim 8, wherein said elongate projection is a shaft having one end threaded and engaged in a threaded opening in said third member, said engaging means is an enlargement at the other end of said shaft and said fixture is a wall having an opening through which said shaft can slide but is of such dimensions that passage therethrough of either the enlargement or the third member is prevented.

10. An applicator as claimed in claim 2, wherein said moving means is a spring.

11. An applicator for animal ear tags comprising: a body which includes a handle; lever means pivotally coupled to said body; ear tag component retention means mounted by said body at a position spaced away from said pivot; a first member coupled to said lever means and carried by said body to be movable rectilinearly towards said retention means by movement of said lever means relative to said handle, said first member having a bore which is closed at one end except for an axial opening therethrough; a second member which includes a section adapted to rectilinearly slide within the bore of said first member and has a projection therefrom which engages with the opening in said closed end; a pin mounted axially on the end of the projection remote from said section; spring means located about said projection between said closed end and said section; locking means coupling said second member to said first member such that the pin projects from said first member toward the retention means; and actuating means operable to release said locking means when said first member has moved a determined distance toward the retention means and so permit said spring means to move said second member relative to said first member in a rectilinear direction away from said retention means.

12. An applicator as claimed in claim 11, wherein said section forms a ball bearing cage, the balls of which in the locked position engage in an annular groove in the inside wall of the said bore, there being a third member mounted for slidable movement within the bore and which engages with said bearing cage to positively locate said balls in the annular groove.

13. An applicator as claimed in claim 12, wherein said bearing cage is cup-shaped with balls located in openings in the wall thereof, the said third member having a projection which engages within said cup shape to push the balls outwardly through the openings to engage in said groove.

14. An applicator as claimed in claim 12, wherein the body includes a support means; said first member is slidably located by said support means; axially adjustable limit means is coupled to said third member; and stop means are fixedly attached to said support means, the limit means cooperating with the said stop means to limit the extent of movement with respect to the support means of the third member whereupon continued movement of the second member when the third member has reached the limit of its travel causes the projection to withdraw from the bearing cage and permit movement of the bores to release the first member from its locked position.

15. An applicator for animal ear tags comprising: a body which includes a handle; lever means pivotally coupled to said body; first ear tag component retention means mounted by said body at a position spaced away from said pivot; a first member coupled to said lever means and carried by said body to be movable rectilinearly toward said first retention means by movement of said lever means relative to said handle; a second member mounted upon and rectilinearly movable relative to said first member; second ear tag component retention means mounted by said second member in an opposing relationship with said first retention means; means for moving said second member relative to said first member; locking means coupling said second member to said first member; and actuating means operable to release said locking means when said first member has moved a determined distance toward the first retention means and so permit said moving means to move said second member relative to said first member in a rectilinear direction away from said first ear tag component retention means.

16. An applicator as claimed in claim 15, wherein: said body includes a support means; said first member is slidably located by said support means; and said second member is slidably located by said first member.

17. An applicator as claimed in claim 16, wherein said locking means is formed by a ball-bearing cage attached to said second member, the balls of which, in the locked position, engage a seating in the said first member, there being a third member movably located by said first member which engages with said bearing cage to positively locate said balls in the sealing.

18. An applicator as claimed in claim 17, wherein said ball-bearing cage is cup-shaped with the balls located in openings in the wall thereof, the third member having a projection which engages within said cage to push the balls outwardly through the openings and engage in said seating.

19. An applicator as claimed in claim 17, wherein said actuating means comprises an elongate projection extending from said third member and a fixture mounted by the support means, said elongate projection having engaging means remote from said third member which is engageable with said fixture to restrict movement of said third member relative to the support means.

20. An application as claimed in claim 19 wherein said second retention means is a pin which projects from said first member.

* * * * *